United States Patent [19]

Garman

[11] Patent Number: 4,652,167

[45] Date of Patent: Mar. 24, 1987

[54] PIVOT JOINT PIN RETENTION

[75] Inventor: Anthony L. Garman, Stevensville, Mich.

[73] Assignee: Clark Michigan Company, Cleveland, Ohio

[21] Appl. No.: 861,684

[22] Filed: May 12, 1986

[51] Int. Cl.[4] .............................................. F16C 11/06
[52] U.S. Cl. ...................... 403/158; 403/16; 403/162; 29/434
[58] Field of Search ................ 403/158, 154, 162, 16; 29/434

[56] References Cited

U.S. PATENT DOCUMENTS

| | | |
|---|---|---|
| 3,841,771 | 10/1974 | Shankwitz et al. |
| 4,022,536 | 5/1977 | Piepho et al. |
| 4,057,005 | 11/1977 | Siewert et al. ................ 403/162 X |
| 4,243,341 | 1/1981 | Kabay et al. ........................... 403/16 |
| 4,398,862 | 8/1983 | Schroeder . |

Primary Examiner—Andrew V. Kundrat
Attorney, Agent, or Firm—Kenneth C. Witt; John C. Wiessler

[57] ABSTRACT

A pin retention mechanism for a pivot joint which connects together two structural members of a machine for pivotal movement relative to each other. The pivot pin has a dynamic connection with one of the structural members and there is an annular spacer on the pivot pin adjacent the dynamic connection. The other structural member has a tapered opening through it with the taper either on the structural member itself or on a bushing within an opening in the other structural member. A collet in the tapered opening has an external surface mating with the tapered internal surface. A cylindrical sleeve is located between the collet and the pivot pin and in contact with the spacer.

8 Claims, 4 Drawing Figures

PIVOT JOINT PIN RETENTION

CROSS-REFERENCE

This application is related to application Ser. No. 695,011 Garman et al filed Jan. 25, 1985 in that a portion of the disclosure is common to both.

BACKGROUND OF THE INVENTION

1. Field of the Invention:

This invention relates to a pin retention mechanism for a pivot joint which connects together two structural members of a machine for pivotal movement relative to each other about a pivot axis.

2. Description of the Prior Art:

The following U.S. patents show pin retention mechanisms for pivot joints which connect together two structural members of a machine for pivotal movement relative to each other, which mechanisms employ tapered wedge members:

U.S. Pat. No. 3,841,771, Shankwitz, dated Oct. 15, 1974;

U.S. Pat. No. 4,022,536, Piepho et al, dated May 10, 1977; and

U.S. Pat. No. 4,398,862, Schroeder, dated Aug. 16, 1983

SUMMARY OF THE INVENTION

This invention is a pin retention mechanism for a pivot joint which connects together two structural members of a machine for pivotal movement relative to each other. The pivot pin has a dynamic connection with one of the structural members and there is an annular spacer on the pin adjacent the dynamic connection. The other structural member has a tapered opening through it with the smallest diameter of the taper at the inner surface of the opening and adjacent the spacer. There is a collet in the opening having a tapered external surface mating with the tapered internal surface on the structural member. There is a cylindrical sleeve between the collet and the pivot pin and in contact with the spacer. Both the collet and the sleeve have longitudinal slots in them to facilitate their deformation when the joint is assembled.

DESCRIPTION OF THE PREFERRED EMBODIMENTS

Figure 1:
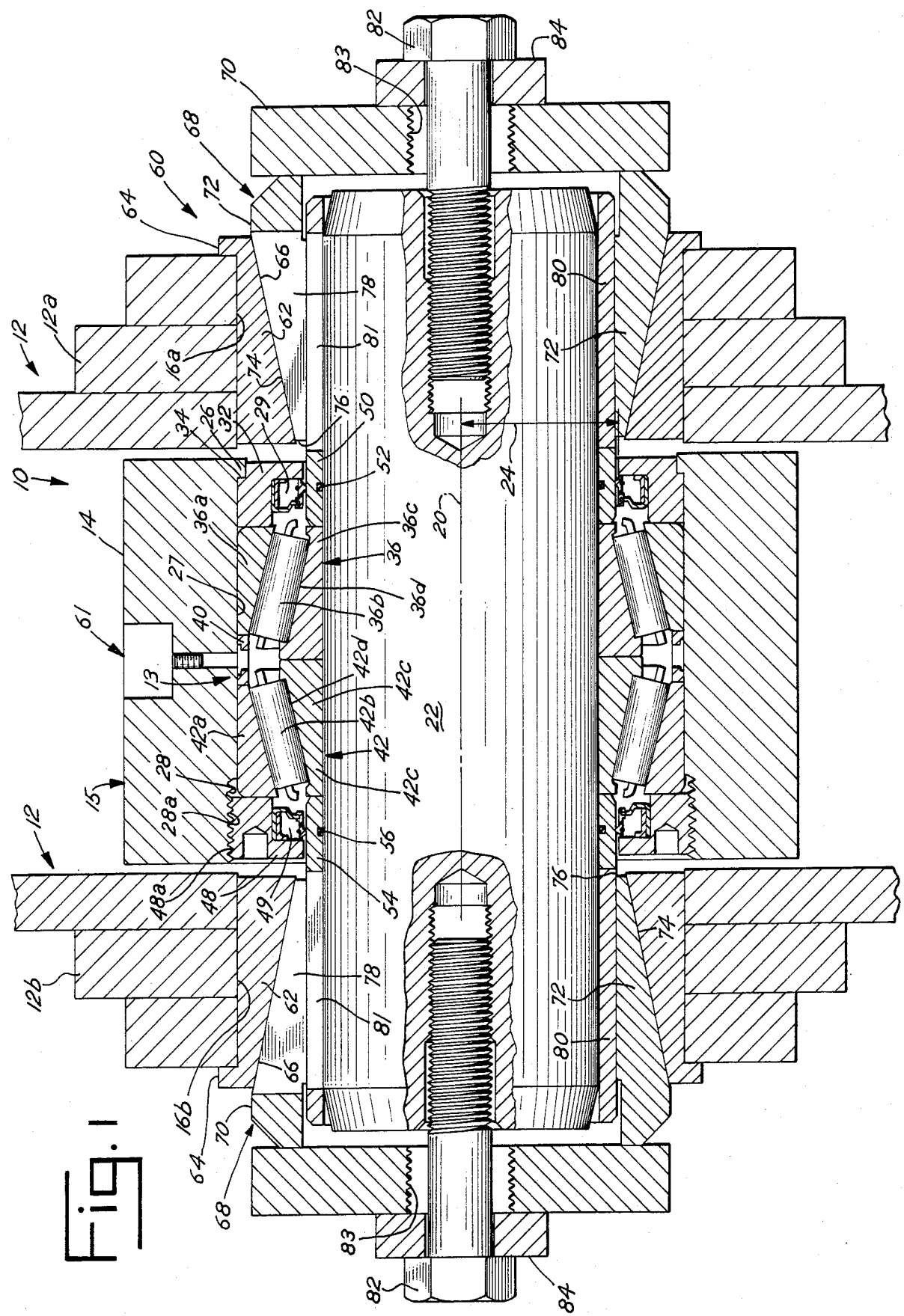
FIG. 1 of the drawing shows an axial sectional view, in section except for the pin, of a pivot joint pin retention mechanism in accordance with the present invention in association with the bearing retainer mechanism of the aforementioned related patent application.

FIG. 1 of the drawing shows a bearing retainer mechanism 10 pivotally connecting two relatively movable members 12 and 14 to form a pivot joint 15. Member 12 is bifurcated and includes two spaced apart flanges 12a and 12b which may be part of a bracket on a loader bucket. The other member 14 is a housing which is located in part between flanges 12a and 12b, and may be connected to a bellcrank which pivots the bucket. Each of the flanges 12a and 12b and housing 14 has a circular opening therethrough, indicated by the numerals 16a and 16b respectively for the two flanges and the numeral 13 for a stepped opening through housing 14, with the centers of such openings coinciding along an axis 20 extending transversely to planes coinciding with said movable members.

The stepped opening 13 through housing 14 includes an inwardly extending flange 26 at one end, an intermediate diameter section 27, and a third larger diameter section 28 which is threaded. When assembled the joint 15 includes a retainer ring 32 having a shoulder portion 34 which abuts flange 26; this retainer ring carries a dynamic seal 29. A bearing assembly 36 has an outer race or cup 36a which abuts retainer ring 32 and a cone assembly 36d which is inclusive of rollers 36b and cone 36c. A spacer 40 abuts race 36a. The outer race or cup 42a of bearing assembly 42 abuts spacer 40, and a retainer ring 48 abuts race 42a. Bearing assembly 42 also includes a cone assembly 42d which is inclusive of rollers 42b and cone 42c. Retainer ring 48 has an external threaded portion 48a which mates with an internal threaded portion 28a in housing 14, and carries a dynamic seal 49. Both seals 29 and 49 are pressed in place prior to the assembly of this bearing retainer mechanism as described below.

A cylindrical pivot pin 22, which is the principal structural member of the pivot joint 15, is located within openings 16a, 13 and 16b coaxially with axis 20, and is the part on which housing 14 is journaled for oscillatory pivotal movement.

In assembling bearing retainer mechanism 10 the first steps are done with the housing 14 separate from flanges 12a and 12b. The first step is to insert retainer ring 32 into opening 13 until shoulder 34 on the retainer ring abuts flange 26. Then, in order, the outer race 36a of bearing 36, the cone assembly 36d the spacer 40, the cone assembly 42d of bearing 42, and the outer race 42a of bearing 42 are assembled in housing 14. Then retainer ring 48 which has external threads 48a to mate with the threads 28a on section 28 is assembled to retain the bearings and related parts in place and to preload the bearings.

Next spacers 50 and 54 which carry seals 52 and 56 respectively are inserted through seals 29 and 49 respectively until said spacers abut cones 36c and 42c respectively. Housing 14 with the bearing retainer mechanism 10 and and bearings assembled on it along with spacers 50 and 54 is aligned so that the axis of opening 13 is coaxial with axis 20 and thus is coaxial with openings 16a and 16b in bifurcated frame member 12. Pin 22 is then inserted through members 12a, 14 and 12b respectively and is secured to each of 12a and 12b by a pin retention mechanism of the present invention.

The pin retention mechanism of this invention is indicated generally by the numeral 60 and there is one at each end of pin 22, one being the mirror image of the other as shown in FIG. 1. The right hand mechanism of FIG. 1 is shown on a larger scale in FIG. 2. In one embodiment mechanism 60 includes a tapered bushing 62 which is pressed into the opening 16a in member 12a or opening 16b in member 12b. Bushing 62 includes a shoulder portion 64 and a tapered inner surface 66 which has the largest diameter of the taper at the axially outer end and the smallest diameter at the axially inner end of bushing 62. Within the bushing 62 is a portion of a collet member 68. The collet comprises an outer flat circular head portion 70 which is secured in a suitable manner such as by welding to an inner skirt portion 72. As illustrated the inwardly extending tapered skirt portion includes an external tapered surface 74 which mates with surface 66 in that these two surfaces are in frictional contact when assembly of the invention is completed. The axial inner margin 76 of collet 68 is adjacent spacer 50 for the right one and 54 for the left one. The tapered portion of the collet 68 includes at least one longitudinally extending slot 78 from the inner margin 76 of the collet to near head portion 70. FIG. 3 shows a perspective view of the skirt portion 72 of the collet 68 separate from the remainder of the structure, and it has three slots in this preferred embodiment.

Inside of collet 68 is a sleeve 80 which is in contact at its axially innermost end with spacer 50 on the right and spacer 54 on the left. Sleeve 80 also has at least one longitudinal slot 81 and in the preferred construction shown in FIG. 4 of the drawing there are three such slots.

In preparing for assembly according to the present invention the steps previously described are carried out culminating with the insertion of pin 22 through members 12a, 14 and 12b. Then the sleeves 80 are moved in axially from the opposite ends of the pin 22 respectively until they contact spacers 50 and 54. After tapered bushings 62 are installed in members 12a and 12b respectively, either during the final assembly as described in this paragraph or prior to the final assembly, collets 68 are put into place axially from each end of the pin respectively. Then a machine screw 82 is threaded into the end of pin 22 at each extremity. A washer 84 may be utilized between machine screw 82 and collet 68. Both machine screws are tightened up and torqued to a suitable amount. The wedging action of the tapered collets respectively on the sleeves 80 and on pin 22 secures the pins to flanges 12a and 12b to prevent pin rotation or axial movement of the pin relative to the pivot joint.

The present invention eliminates the necessity of using shims in or as a part of the pivot joint, and it also eliminates welding to the pin. It provides a means of retention for high strength, high alloy pins that are nonweldable. It eliminates the use of lock plates.

The removal of pin 22 is accomplished by first removing the machine screws 82 from the pin and collets 68 at the respective ends of the pin. Larger screws are then tightened in threads 83 in the collets which screws bear against the ends of pin 22 and back the collets out of the tapered bushing bores 66, after which the pin 22 can be withdrawn.

In this invention the spacer 50 contacts bearing race 36c, and spacer 54 contacts bearing race 42c. Sleeves 80 contact spacers 50 and 54, however, the forces exerted on the bearing assemblies through sleeves 80 are relatively small and do not exert undue forces on the bearing assemblies which might be damaging to them.

Figure 2:
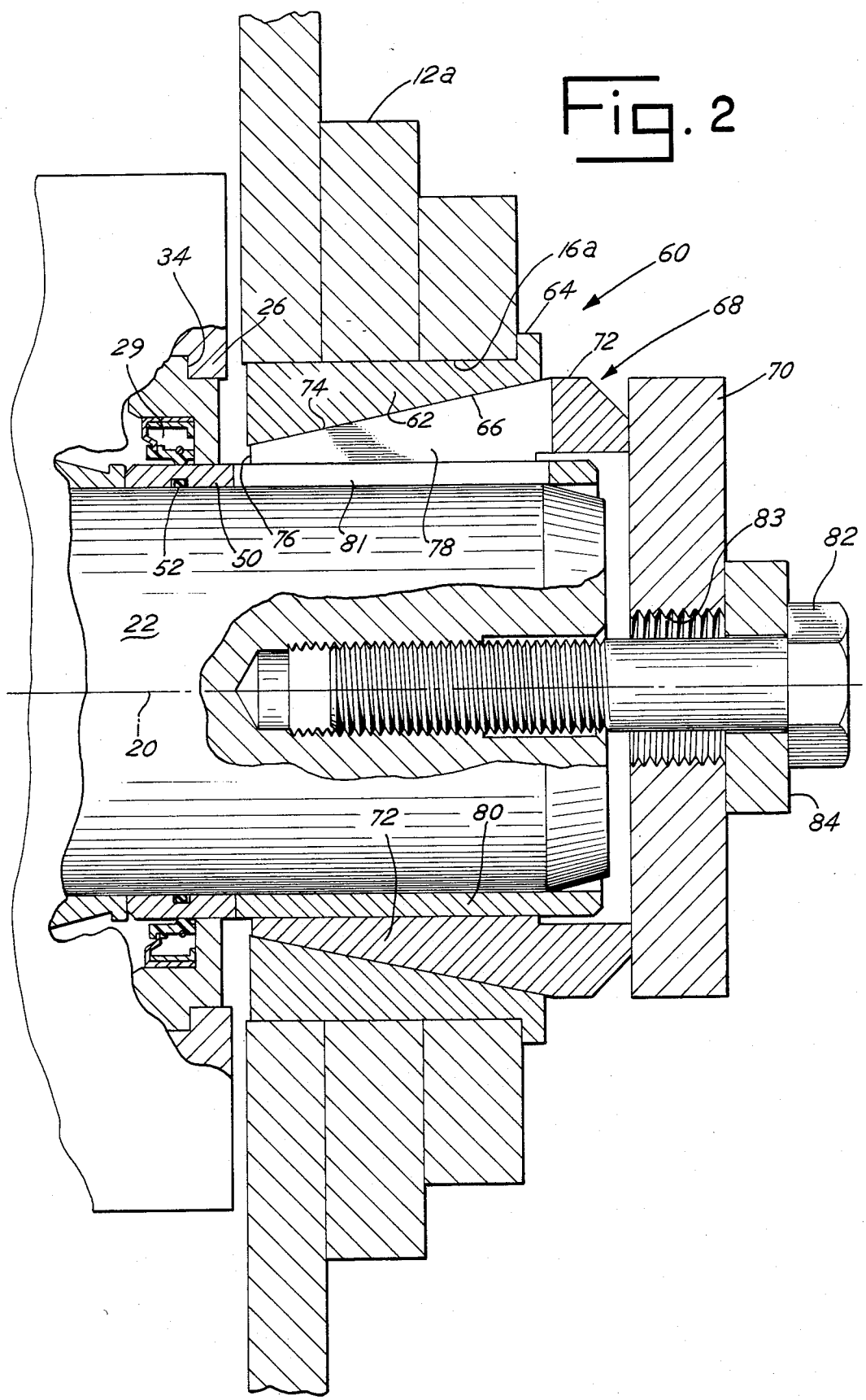
FIG. 2 is an enlarged view of the present invention.
Figure 3:
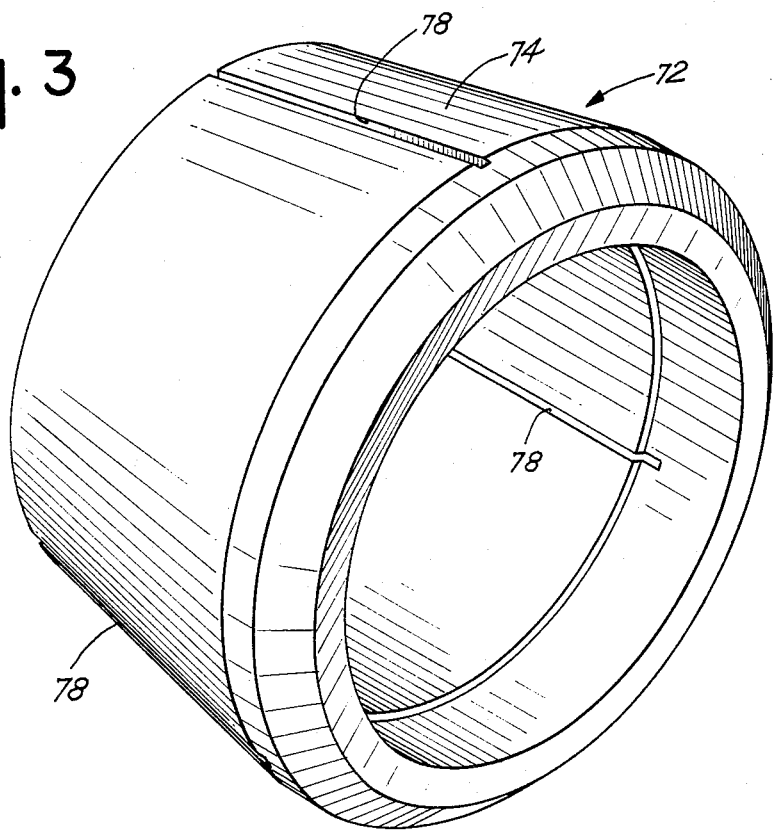
FIG. 3 is a perspective view of a collet which is a part of this invention.
Figure 4:
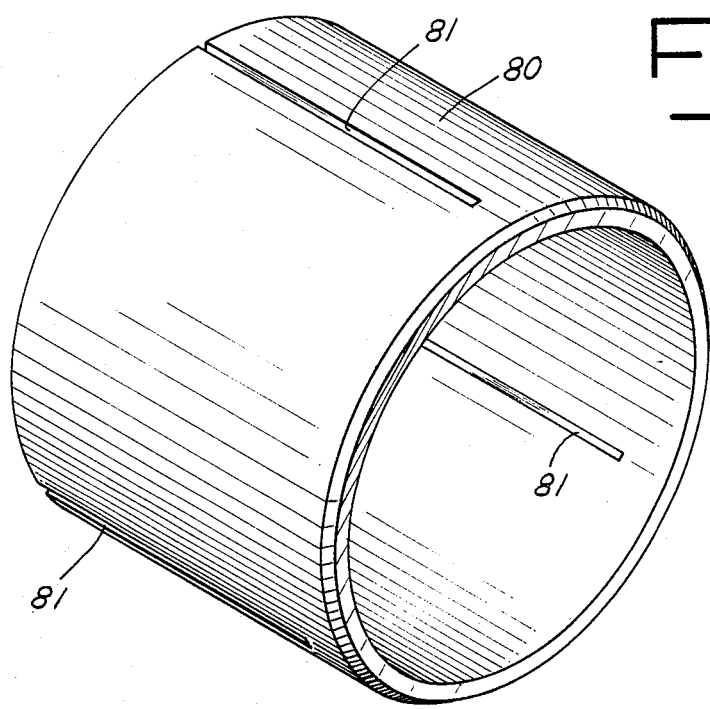
FIG. 4 is a perspective view of a sleeve which is a part of this invention.

While I have described and illustrated herein a preferred embodiment of my invention and also the best mode contemplated for carrying it out as shown in FIGS. 2, 3 and 4, it will be understood by those skilled in the art that modifications may be made. For example, it will be appreciated that a other types of bearings may be utilized to provide the dynamic connection between the pivot pin and the inner structural member 14. Also it will be understood that the bushings 62 can be omitted if desired and the tapered surfaces 66 formed on the structural members 12a and 12b. I intend to cover by the appended claims all such modifications which fall within the true spirit and scope of my invention.

I claim:

1. A pin retention mechanism for a pivot joint which connects together two structural members for pivotal movement relative to each other about a pivot axis, one of said structural members having two laterally spaced portions, each of said spaced portions having a circular opening therein with the centers thereof aligned along said axis, the other said structural member located in part between said spaced portions, a third circular opening through said other structural member coaxial with said axis, a pivot pin extending through said three openings, and a bearing assembly between said other structural member and said pin, the pin retention mechanism comprising, an annular spacer on said pin abutting said bearing assembly and adjacent a first opening through one of said laterally spaced portions, said first opening having an internal taper with the largest diameter of the taper at the outer surface of said one laterally spaced portion and the smallest diameter of the taper at the inner surface of said one laterally spaced portion and adjacent said spacer, a collet in said first opening having a tapered external surface mating with said internal taper, said collet having at least one slot extending longitudinally from its inner margin, a cylindrical sleeve between said collet and said pivot pin and in contact with said annular spacer, and said sleeve also having at least one longitudinal slot therein from its inner margin.

2. A pin retention mechanism as in claim 1 wherein an annular bushing is interposed between said one laterally spaced portion and said collet.

3. A pin retention mechanism as in claim 1 wherein there are a plurality of slots extending longitudinally from the inner margin of said collet.

4. A pin retention mechanism as in claim 1 wherein there are a plurality of slots extending longitudinally from the inner margin of said sleeve.

5. A pin retention mechanism as in claim 1 wherein there are a plurality of slots extending longitudinally from the inner margin of said collet, and there are a plurality of slots extending longitudinally from the inner margin of said sleeve.

6. A pin retention mechanism for a pivot joint which connects together two structural members for pivotal movement relative to each other about a pivot axis, one of said structural members having two laterally spaced portions, each of said laterally spaced portions having a circular opening therein with the centers thereof aligned along said axis, the other said structural member located in part between said spaced portions, a third circular opening through said other structural member coaxial with said axis, a pivot pin extending through said three openings, and a bearing assembly between said other structural member and said pin, the pin retention mechanism comprising an annular spacer on said pin abutting said bearing assembly and adjacent a first opening through one of said laterally spaced portions, a tapered bushing in said first opening having an internal taper with the largest diameter of the taper adjacent the outer surface of said one laterally spaced portion and the smallest diameter of the taper at the inner margin of said bushing and adjacent said spacer, a collet in said first opening having a tapered external surface mating with said internal taper, said collet having at least one slot extending longitudinally from its inner margin, a cylindrical sleeve between said collet and said pivot pin and in contact with said annular spacer, and said sleeve also having at least one longitudinal slot therein from its inner margin.

7. A method for assembling a pin retention mechanism for a pivot joint which connects together two structural members for pivotal movement relative to each other about a pivot axis, one of said structural members having two laterally spaced portions, each of said laterally spaced portions having a circular opening therein with the centers aligned along said axis, each of said circular openings having an internal taper with the largest diameter of the taper at the outer surface of the structural member and the smallest diameter of the taper at the inner surface of the opening, the other said structural member located in part between said spaced portions, a third circular opening through said other structural member coaxial with said axis, a pivot pin extending through said three openings, and a dynamic connection between the said pin and said other structural member, the method comprising installing an annular spacer on said pin abutting said dynamic connection and adjacent a first opening in one of said laterally spaced portions, installing in said first opening and in contact with said pivot pin a cylindrical sleeve which has at least one longitudinal slot therein from its inner margin, the inner margin of said sleeve abutting said annular spacer when installed, installing in said first opening in contact with said sleeve a collet having a tapered external surface mating with one said internal taper and at least one slot extending longitudinally from its inner margin, and tightening a screw which is threaded into the end of said pin to secure the pin to said one laterally spaced portion.

8. A method for assembling a pin retention mechanism for a pivot joint which connects together two structural members for pivotal movement relative to each other about a pivot axis, one of said structural members having two laterally spaced portions, each of said spaced portions having a circular opening therein with the centers aligned along said axis, the other said structural member located in part between said spaced portions, a third circular opening through said other structural member coaxial with said axis, a pivot pin extending through said three openings, and a dynamic connection between said pin and said other structural member, the method comprising installing an annular spacer on said pin abutting said dynamic connection and adjacent a first opening in one of said laterally spaced portions, installing in said first opening a bushing having an internal taper with the largest diameter of the taper at the outer surface of the structural member and the smallest diameter of the taper at the inner surface of said bushing, installing on said pivot pin a cylindrical sleeve which has at least one longitudinal slot therein from its inner margin, the inner margin of said sleeve abutting said annular spacer when installed, installing in said bushing in contact with said sleeve a collet having a tapered external surface mating with said internal surface and at least one slot extending longitudinally from its inner margin, and tightening a machine screw which extends through an aperture in said collet and is threaded into the end of said pin to wedge the collet between abutting elements and thereby secure the pin to one of said laterally spaced portions.

* * * * *